United States Patent [19]
Engeler et al.

[11] Patent Number: 5,753,798
[45] Date of Patent: May 19, 1998

[54] PRESSURE SENSOR FOR GASEOUS AND/OR LIQUID MEDIA OF INTERNAL COMBUSTION ENGINES WITH IMPROVED TEMPERATURE STABILITY

[75] Inventors: Paul Engeler, Frauenfeld; Christof Sonderegger, Neftenbach, both of Switzerland

[73] Assignee: K. K. Holding AG, Winterthur, Switzerland

[21] Appl. No.: 685,007

[22] Filed: Jul. 22, 1996

[30] Foreign Application Priority Data

Jun. 4, 1996 [EP] European Pat. Off. ............... 96810362

[51] Int. Cl.⁶ ............... G01L 23/22; G01N 25/20; G01M 15/00
[52] U.S. Cl. ............... 73/35.13; 73/115
[58] Field of Search ............... 73/35.07, 35.12, 73/35.13, 115, 756; 123/425, 426, 435

[56] References Cited

U.S. PATENT DOCUMENTS

| | | | |
|---|---|---|---|
| 2,841,979 | 7/1958 | Harbert | 73/35.07 |
| 3,403,561 | 10/1968 | List et al. | 73/115 |
| 3,600,941 | 8/1971 | Kammeraad | 73/115 |
| 4,430,899 | 2/1984 | Wessel . | |
| 4,432,228 | 2/1984 | Kuschmierz et al. . | |
| 4,476,711 | 10/1984 | Gutterman | 73/35.13 |
| 4,483,181 | 11/1984 | Maekawa et al. | 73/35.13 |
| 4,843,887 | 7/1989 | Engeler et al. . | |
| 4,996,873 | 3/1991 | Takeuchi . | |
| 5,031,460 | 7/1991 | Kanenobu et al. . | |
| 5,199,303 | 4/1993 | Benedikt et al. . | |

FOREIGN PATENT DOCUMENTS 0508739  10/1992  European Pat. Off. ............ 73/35.13

Primary Examiner—Ronald L. Biegel
Assistant Examiner—William L. Oen

[57] ABSTRACT

A pressure sensor having a disk-shaped sensor body which includes a pressure space for the medium to be measured. A bolt element in the pressure space forms a tubular pressure gap of small volume. The bolt element also forms a heat accumulator before the pressure transducer surface of the sensor body and acts on a temperature compensating element to narrow the temperature swings in the sensor due to temperature shocks. The new pressure sensor may be used for hot combustion gases and for fuels and other liquid or gaseous substances. In the application for monitoring internal combustion engines, the pressure sensor is fitted between the combustion chamber and the indicator valve instead of after the indicator valve, making possible periodic blowing-through and hence the removal of all combustion residues and calibration measurement any time.

19 Claims, 4 Drawing Sheets

Fig.4
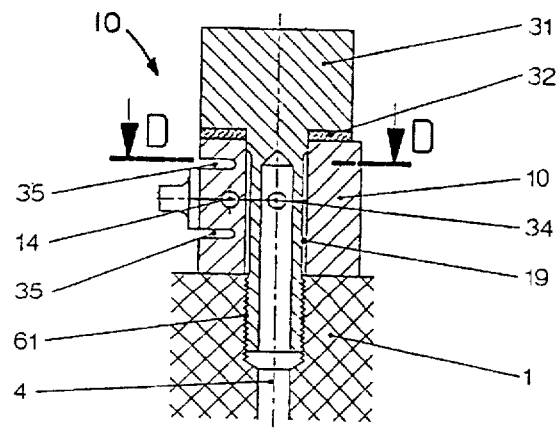
Fig.5
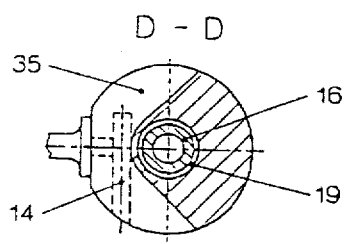
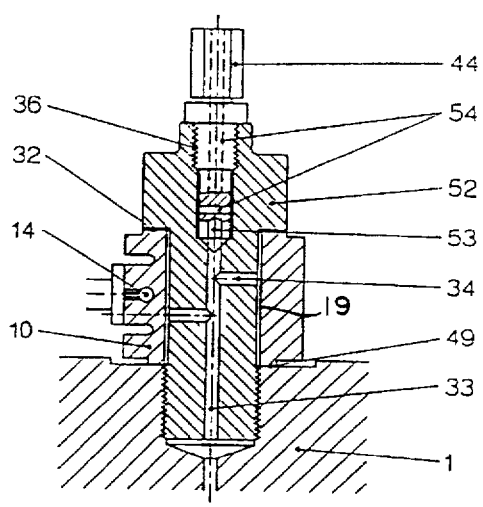
Fig.6
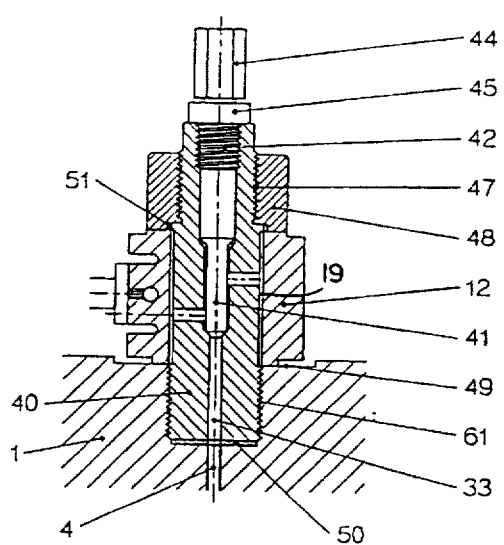
Fig.7

PRESSURE SENSOR FOR GASEOUS AND/OR LIQUID MEDIA OF INTERNAL COMBUSTION ENGINES WITH IMPROVED TEMPERATURE STABILITY

BACKGROUND AND SUMMARY OF THE INVENTION

From EP-B-283 524 corresponding to U.S. Pat. No. 4,843,887 a method and an arrangement are known for measuring the pressure inside tubular bodies. This known arrangement needs two electronic summation or subtraction circuits to determine the pressure named, necessitating a considerable outlay on equipment.

Furthermore, continuous monitoring of the combustion processes in every cylinder of internal combustion engines, such as diesel or gas engines, has become essential if the emission regulations are to be observed, environmental violation prevented and economical operation ensured. At the same time, the power delivered by each cylinder is being included increasingly in the monitoring parameters, as is the surveillance of the injection processes. In the future, the insurance companies too will impose far more stringent requirements on ship operation, demanding documented monitoring data. With gas engines moreover, the ignition must be monitored on every cylinder, to prevent gas explosions in the exhaust pipes.

For decades now in engine research, cylinder pressure has been measured with cylinder pressure sensors fitted as close to the combustion chamber as possible. For this purpose, piezoelectric diaphragm sensors have been employed almost exclusively. Their diaphragm parts are exposed to high flame temperatures, consequently their service life is short.

Accordingly for monitoring purposes there is a need for sensors lasting at least the full operating period of an engine until the next major overhaul, and giving optimal repeat accuracy during this time.

Until now there have been no sensors fulfilling these requirements satisfactorily. The pressure monitoring sensors now available commercially are designed on the diaphragm principle, using extra-thick diaphragm plates to avoid breakage. These reinforced plate diaphragms are very sensitive to temperature, however. In the course of operation, their surfaces become encrusted with carbon residues, causing progressively increasing measuring errors. Moreover, excessively thick plate diaphragms are prone to fatigue cracks, which may appear only after thousands of operating hours. Acknowledging these problems, the manufacturers of such sensors now propose fitting them not directly in the cylinder cover but only after the indicator cock. This allows individual sensors to be cut out mechanically if they give false readings, and replaced by a spare sensor.

These precautionary measures of present sensor manufacturers involve great expense in keeping a number of spare sensors for every monitoring system. This disadvantage is obviated by the present invention.

Accordingly, the purpose of the invention is to provide a pressure sensor for gaseous and/or liquid media, above all for monitoring internal combustion engines, which combines robustness, reliability, high sensitivity and accuracy with the greatest temperature stability possible, i.e. small temperature changes due to temperature shock variations of combustion gases, in order to reduce temperature shock errors when measuring combustion pressure.

The invention meets this very complex requirement by using, instead of a flat diaphragm, a circular-cylindrical pressure transducer surface in an essentially C-shaped disk sensor body. A tangential hole in the sensor body is parallel to the secant in which an extensometer is positioned. A concentric bolt element is interior the pressure transducer surface so that a tubular pressure gap of low volume results therebetween. The pressure medium in the gap acts radially on the C-shaped sensor body. The bolt creates a heat accumulator before the circular-cylindrical pressure transducer surface and acts as a temperature compensating element, avoiding unnecessary dead space.

Also of importance for the sensitivity and accuracy is that the diameter of the pressure space in relation to the overall size of the sensor body is dimensioned as large as strength and space considerations allow. For hydraulic applications, however, like measuring the fuel injection pressure on diesel or gas engines, this would entail a large dead volume. This is reduced decisively by the bolt element of diameter d, which reduces the pressure space to a pressure gap of small volume.

When measuring the pressure of hot gases, as when measuring the combustion pressure of fuel gases in engines, the plug element has a decisive influence also on the temperature stability in the sensor body and hence on the measured results. This influence is owed partly to the reduction of the pressure space volume for the medium being measured to a narrow pressure gap, so that the heat input to the sensor is likewise reduced significantly, and partly because the plug element constitutes a kind of heat accumulator, in which a mean temperature is established, equalizing to some extent the temperature shock variations due to individual engine cycles. The plug element thus becomes a relatively cool and constant-temperature heat sink, holding the gas temperature variations in the sensor within limits.

A particularly advantageous embodiment of the new sensor emerges when the sensor body is at least essentially C-shaped, and the tangential hole runs parallel with the secant.

The 'C' shape allows indirect pressure measuring by virtue of its unilaterally higher elasticity, which is pronounced parallel with the secant and is detected by the extensometer element in the tangential hole. Here the mirror-symmetric assembly of the actual measuring sensor improves the sensitivity and accuracy of the measured results.

For measuring cylinder pressures in engines, the new sensor offers interesting new installation possibilities. Thus, for example the sensor, unlike the state of the art, does not have to be placed after a mechanical shutoff valve for monitoring but can be fitted between the shutoff valve and the engine space. The purpose of this arrangement is to enable periodic scavenging by briefly opening the shutoff valve. This brief scavenging blows out all residues, freeing the surface so that the measuring accuracy is repeatedly stabilized periodically. Unlike a plate diaphragm, the new sensor sustains no flexural stressing. Consequently, the new sensor, according to the invention, outlasts a sensor with plate diaphragm many times over. The construction of the new sensor and its preferential arrangement between combustion chamber and shutoff valve, together with the scavenging facility, thus make possible a monitoring system that manages, without spare sensors, and attains a hitherto unequalled repeat accuracy. The invention also allows continuous evaluation of the indicated performance, i.e. the indicated pressure, for each cylinder, which calls for high repeat accuracy of the individual sensors and exact reference to the piston position.

An advantageous embodiment of the new sensor is obtained when the extensometer element is based on piezoelectrics and as electromechanical transducer element having at least one piezoelectric plate on both sides of a contact part arranged in its center.

Here, piezoelectric ceramic elements or monocrystals such as quartz, tourmaline and other piezocrystals have acquitted themselves as piezoelectric plates. However, it is also possible to employ a statically measuring extensometer element based on piezoresistive silicon crystals, on thinfilm, capacitive or fibre-optic technology.

For assembling the new sensor, it is advantageous if the bolt element can take the shape of a central assembly element. The sensor may be mounted on a container for the medium to be measured, such as the cylinder cover of an internal combustion engine.

The thermal stressing of the sensor sustained from the already small amount of gas in the pressure gap can be reduced still further by providing the sensor body with a thread for screwing into a container holding the medium to be measured, such as the cylinder cover of an internal combustion engine, or where such a connection, typically for mounting the pressure sensor, is provided between the connecting thread for an indicator valve and the cylinder cover. In this way, on an internal combustion engine, the heat of the combustion gases is led off from the sensor body into the cooled cylinder cover. The mounting of the pressure sensor using a connecting thread brings the additional advantage that the sensor is freely rotatable before the connection is tightened, facilitating its installation.

Changing the pressure sensor during engine operation, for example is made possible, according to a further idea of the invention, if the sensor body is held detachable on the cylinder cover by a separate nut which can be screwed onto a screw-in stay bolt inserted in the pressure space as a bolt element. Furthermore, the gas supply to the pressure space of the sensor body can be shut off inside the stay bolt, with a valve screw for example.

To protect the sensitive measuring element in the tangential hole from flexural influences due to vibration, it is expedient to provide relief slots on both sides of the tangential hole in the sensor body, in the direction of the pressure space axis.

BRIEF DESCRIPTION OF THE DRAWINGS

The invention will now be explained with reference to the following figures:

FIG. 4 Embodiment of the new sensor mounted on the cylinder cover of an internal combustion engine by a bolt element.

FIG. 5 Section D—D in FIG. 4.

FIG. 6 Another embodiment of the new sensor on an internal combustion engine, with the access duct for the pressure medium led out via a shutoff valve.

FIG. 7 Embodiment similar to that of FIG. 6.

DETAILED DESCRIPTION OF THE PREFERRED EMBODIMENTS

Figure 1:
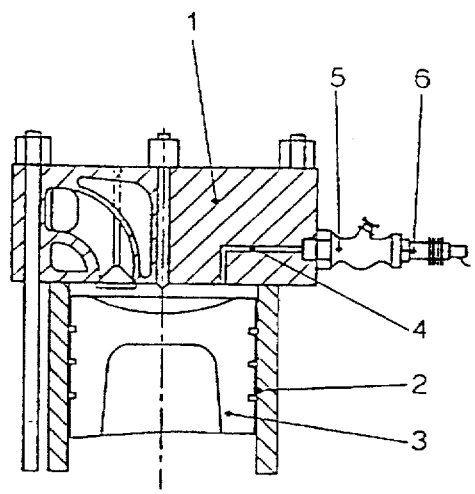
FIG. 1 Prior art sensor mounted on an indicator valve.

FIG. 1 shows a simplified installation of a monitoring sensor 6 according to the prior art, mounted on a shutoff valve such as the indicator valve 5 of an internal combustion engine and communicating with the combustion chamber via the pressure duct 4. The cylinder 2 encloses the piston 3. The pressure sensor 6 has a plate diaphragm, not shown, which varies the electrical values by flexing. Such pressure sensors are described in the literature. The volume of a commercial monitoring sensor 6 usually exceeds that of the indicator valve 5, so that the installed length constitutes a body susceptible to vibration. In normal measuring operation, the indicator valve 5 is opened, so that the pressure sensor 6 is under normal operating pressure. In many cases, however, the pressure sensors 6 are turned on only intermittently to lengthen their service life. But the quality of the monitoring is greatly reduced by this, and the pressure duct 4 may become clogged at any time. This obstruction cannot be cleared by opening the indicator valve 5 again, because no blow-through ensues. Consequently, there is no alternative, but to periodically dismantle the pressure sensors 6 and have the indicator valves 5 blown clear. If a pressure sensor 6 fails, the indicator valve 5 must be closed until a spare sensor can be fitted.

It is evident that the present-day monitoring arrangements themselves need constant supervision and attention, which makes their efficacy appear dubious.

Figure 2:
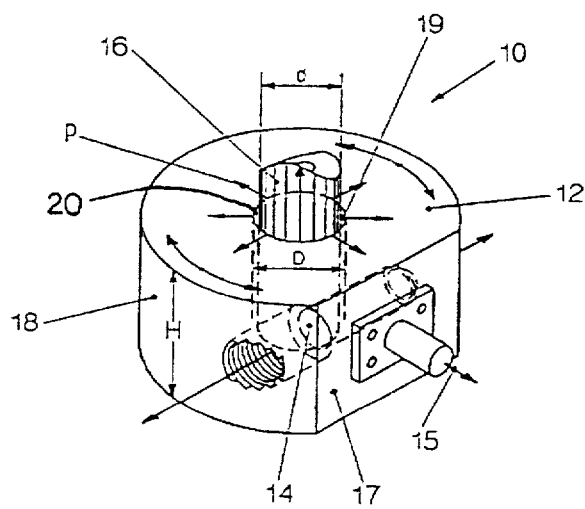
FIG. 2 The new sensor shown isometrically in an advantageous embodiment with C-shaped sensor body.

In the schematic, isometric presentation of the new sensor 10 in FIG. 2, the sensor body 12 is a disk with cylindrical surface 18 bounded by a secant surface 17. In the middle of the disk is a pressure space with diameter D, in which a bolt element 16 of diameter d is inserted, so that a pressure gap 19 of small volume results for the measuring medium. Pressure P in the gap 19 acts on the circular-cylindrical pressure transducer surface 20. The bolt element 16 may be either solid or hollow, see for example hole 27 in FIG. 3.

About half-way up the height H of the disk-shaped sensor body 12 is a tangential extensometering hole 14, in which an extensometer element 22 (FIG. 3) measures the extension induced by the measuring pressure p in the gap 19. The tangential hole's longitudinal axis is 90° in relation to the axis of the pressure gap "tube" 19, and it runs tangentially to the cylindrical surface of the tube 19. In addition, the hole 19 is aligned parallel with the secant 17 of the disk-shaped sensor body 12. To lead off the measuring signals a signal. line 15 is provided in the middle of the measuring element 22, about which more will be said below.

Figure 3:
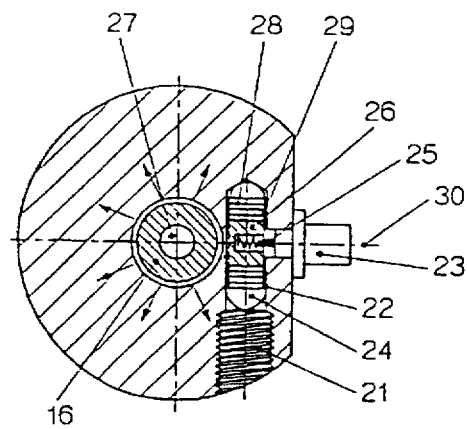
FIG. 3 Section through a sensor vertical to the axis of the tubular pressure gap.

The piezoelectric extensometer element 22, selected as example in FIG. 3, responds even to nanometer length changes, and it is held under preload with a preloading part 21. A plug 23 picks up the measuring signal transversely to the direction of extension in the middle of the element 22 from a contact spring 25 in a hole of a contact part 26. The contact spring 25 lies in a symmetry plane 30 for the extensometer element 22, to which the contact part 26 and piezoelectric disks 28 at least are fitted mirrorsymmetrically. To facilitate irreproachable pressure measuring, the symmetry plane 30 coincides preferentially with a radial plane of the tubular pressure gap 19. For insulation between positive and negative charges, the piezoelectric disks 28 are bedded with the contact part 20 in an insulating sleeve 29. Suitable piezoelectric disks may be of quartz or a piezoelectric ceramic, as are obtainable commercially.

However it is also possible to use an extensometer element 22 working on the piezoresistance, capacitance, fibre optics or strain gauge principle. Because the extension movements do not act exactly on the axis of the tangential hole 14, a spherical support 24 is provided on one or both ends of the extensometer element 22.

In addition to or instead of the preloading part 21, the entire assembly of the separate parts may also be held together gap-free by a preloading sleeve placed under preload, so that no gap surfaces occur and moreover, the extensometer element 22 is easy to install.

Various means may be employed to fit the new sensor, such as screw connections not shown. To seal off the preloading part 21 a weld (not shown) is recommended.

With the embodiment in FIGS. 4 and 5, the bolt element is in the form of an assembly screw 31, which passes through the sensor body 12. It fixes the sensor 10 on the cylinder cover and is itself screwed into the cylinder cover 1 of an internal combustion engine (thread 61). A seal ring 32 is placed between the assembly screw 31 and the sensor body 12.

Since the cylinder cover 1 of the internal combustion engine is cooled, the heat led into the sensor body 12 from the hot combustion gases can be dissipated speedily through the assembly screw 31, so that the sensor 10 is kept relatively cool.

The hot gas stream is led from a pressure duct 4 in the cylinder cover 1 via an access hole 33 and a transverse hole 34 to the pressure gap 19, which in turn allows only a thin-walled hot gas film carrying little heat energy. Here the assembly screw fixed in the water cooled cylinder cover 1 constitutes a kind of heat accumulator, having a relatively large mass compared with the gas quantity in the pressure gap 19 and therefore a great heat capacity. Compared with the fluctuating temperature of the combustion gases, it has a mean temperature and therefore damps the variations caused by temperature shock in sensor 10.

To exclude any disturbing forces due to flexural vibrations of the system from the extensometering hole 14, relief slots 35 are provided on both sides of it. FIG. 5 shows the form of the relief slots 35 on both sides of the extensometering hole 14.

Figure 8:
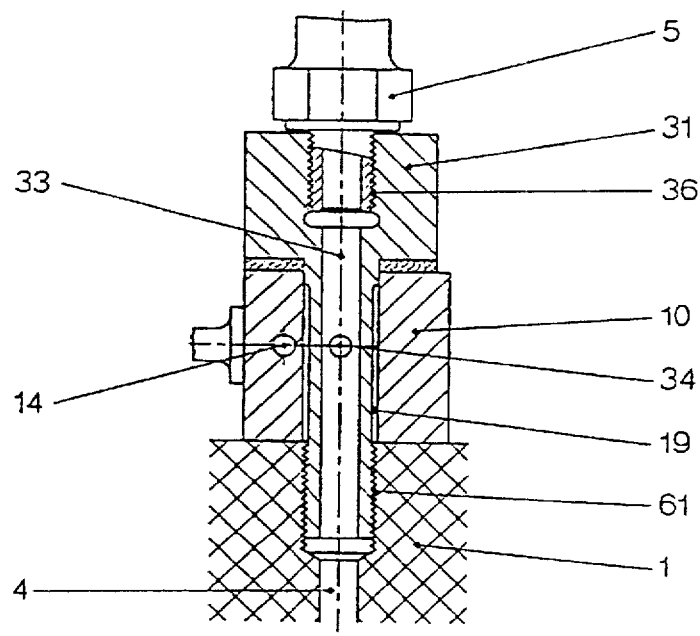
FIG. 8 Embodiment mounted with indicator connection on an internal combustion engine.

FIG. 8 shows a construction similar to FIG. 4. Here the assembly screw 31 takes the form of a through hollow connecting screw for the indicator valve 5, which is screwed into its head via a thread 36.

The arrangement according to FIG. 8 thus combines the pressure sensor 10 with the indicator valve 5, enabling the sensor to be scavenged for cleaning purposes or changed any time without interrupting operation.

In the embodiment according to FIG. 6, the bolt element is an assembly screw 52 as in FIGS. 4 and 8. Like the assembly screw 31 in FIG. 8, it is hollow right through. It contains a valve part 53 which, through an adjustable part 44 via the thread 36, closes access hole 33 above the transverse hole 34 leading to the pressure space 33 in the range of the sensor 10. The valve part 53 and the adjustable part 44 have air vent holes 54 serving to vent the cylinders of the internal combustion engine when racing it at overhauls, after opening the valve part 53.

FIG. 7 shows an embodiment allowing a further optimization of the basic concept. A bolt 40 is screwed firmly into the cylinder cover 1 through a seal 50 and contains an integrated indicator valve, characterized by the valve part 41 and screw part 42, so that the pressure duct 4 can be opened or closed by the adjusting screw 44 and fixing part 45. In this example, the sensor body 12 is pressed onto the sealing surface 49 by nut 48, enabling the signal take off to be turned into the best radial position. A seal ring 51 seals the pressure gap 19 at the top. With valve part 41 closed, after unfastening nut 48 the pressure sensor 10 may be removed without having to stop the internal combustion engine.

Figure 9:
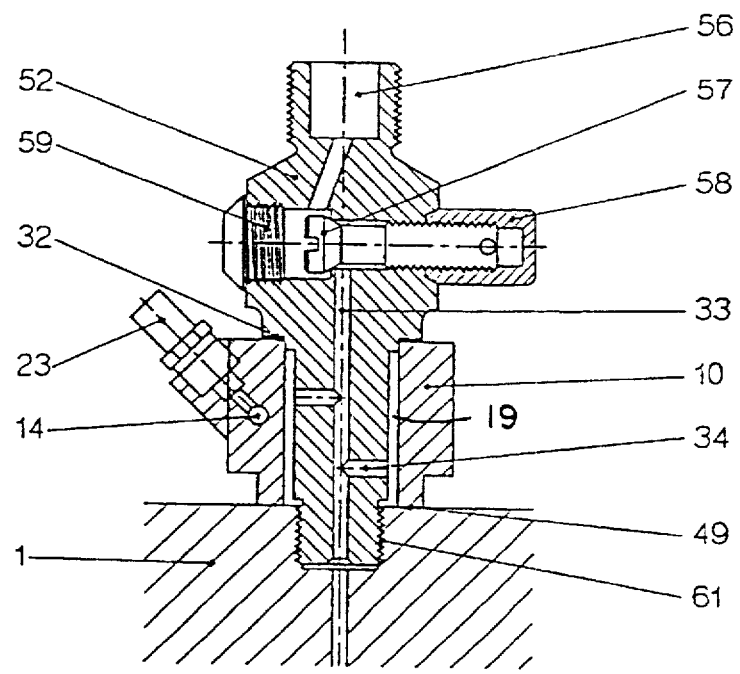
FIG. 9 Another embodiment with the access duct for the pressure medium via a shutoff valve with a connection for a calibrating device.

The bolt element in FIG. 9, which again forms an assembly screw 52, has in its head a valve part 57 transverse to the access passage 33 and closing this likewise. On one side, the valve part 57 has a fixing part 58 and ends with its valve body in an opening leading out. The valve body may be raised from its seat or pressed onto this by turning it in a thread with a tool. The opening may be sealed against the outside with a closing part 59. In addition it has a flow connection to a connecting part 56 for connecting a calibrating instrument, not shown.

Figure 10:
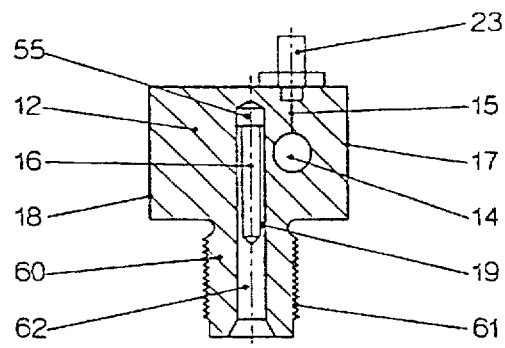
FIG. 10 Embodiment with an assembly thread, used preferentially for measuring injection pump pressure.

The embodiment of the new sensor in FIG. 10, with assembly connection 60 and thread 61, is typical for injection pressure measurement on diesel or gas engines. Fitted in its pressure space as bolt element 16 is a press-in plug element 55. Here the prime purpose of the element 16 is to reduce the dead space and narrow the pressure space to a pressure gap 19 once more. The temperature effect obtained with bolt element 16 is of minor importance in this case, because there are no temperature shocks. The signal line 15 and plug 23 may be arranged radially or axially to the pressure gap 19.

Figure 11:
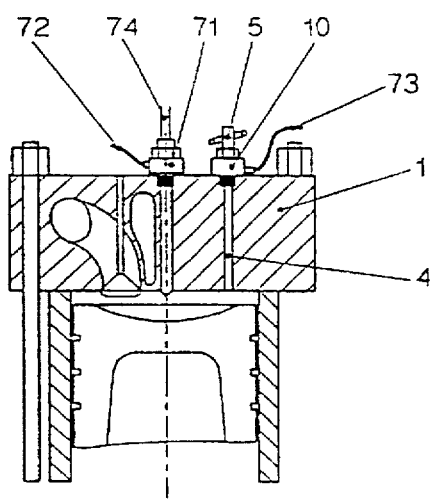
FIG. 11 Embodiment for using the new sensor on an internal combustion engine.

FIG. 11 shows schematically an arrangement of the new sensor on the cylinder cover 1 with the pressure sensor 10 mounted as near to the combustion chamber as possible, to obtain a short pressure duct 4. The indicator valve 5 is placed in a service-friendly position at the end of a connecting line, so that the pressure sensor 10 is located between the combustion chamber and indicator valve 5. Of course, it is also possible to mount the indicator valve 5 straight on the sensor 10 or integrate this in the indicator valve 5, i.e. to combine both in one component. This is especially convenient when retrofitting engines already in service. By opening the handwheel of the indicator valve 5, the pressure duct 4 may be blown through periodically to remove any residues.

On an injection nozzle holder into which an injection line 74 leads, a further sensor 71 for measuring the injection pressure is provided similar to that in FIG. 8, i.e. with a through hole 33 for supplying fuel oil or gas. 72 and 73 are connecting cables for leading away the signals of the injection and cylinder pressures.

Figure 12:
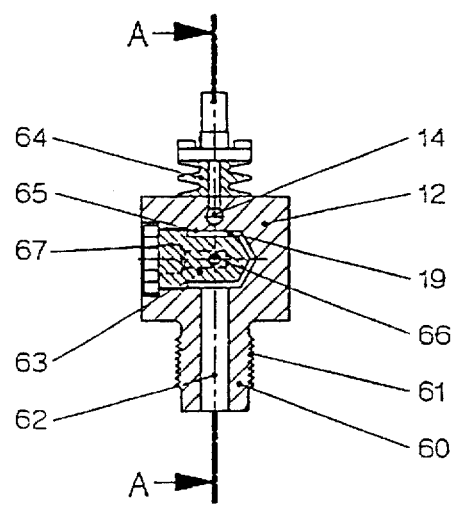
FIG. 12 Another embodiment with the sensor having an attached assembly thread for mounting straight on a container for the pressure medium to be measured.
Figure 13:
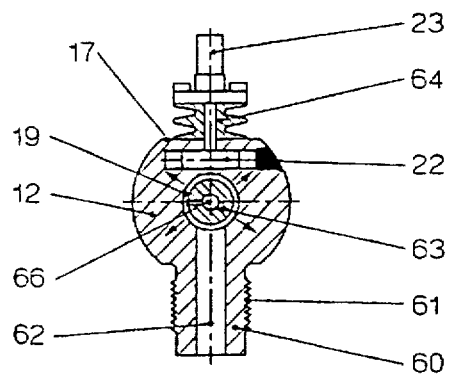
FIG. 13 Section A—A in FIG. 12.

In the example shown in FIGS. 12 and 13, the C-shaped sensor body 12 seats on a mounting connection 60 with thread 61, with which it can be connected directly to a pressure admission line 62 for the medium to be measured. Its tangential hole for the measuring element 22 and the secant 17 of the 'C' shape are diametrically opposite the mounting connection 60. Accordingly, the pressure space 65 and the tubular pressure gap 19 with its concentric longitudinal axes lie transverse to the line 62, with a plug 63 creating the pressure gap 19 screwed into the sensor body 12 from the side. In the plug 63, holes may be provided linking a connection 67 for a calibration sensor and the pressure space 65, thus permitting continuous monitoring of the new pressure sensor.

Between the plug 23 for the signal line connections and the secant 17 of the sensor body 12 is a finned heat sink 64, preferentially of a poorly heat-conducting material such as plastic injection moulding or ceramic. It serves to shield the electronics including a preamplifier connected to the signal lines against excessive temperatures.

When employed on internal combustion engines, the new pressure sensor according to the invention, which may be used for both liquids and gases, makes it possible for the first time to monitor the relevant parameters continuously. The ability to maintain signal transmission by cleaning the pressure duct 4 and the connecting hole 33, blowing them through periodically, and the calibration facilities, bring a new operational reliability hitherto unattained. Also the use of the new sensor according to the invention for injection processes with oils or fuel gases, and the ever higher peak pressure applications, allow a previously unequalled reliability by virtue of the direct measuring principle. The new sensor technology thus brings significant advances, especially in the monitoring of internal combustion engines.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Pressure sensor for gaseous and/or liquid media comprising:
    a sensor body having a pressure space and having a tangential hole having an axis at 90° to a longitudinal axis of the pressure space;
    an extensomeeter element in said tangential hole;
    a bolt element in the pressure space and extending along said longitudinal axis to form with the sensor body a tubular pressure gap of small volume;
    the pressure medium to be measured in the tubular pressure gap acts radially with respect to said longitudinal axis on a pressure transducer surface of the pressure space of the sensor body; and
    said bolt element forming a heat accumulator before said pressure transducer surface.

2. Pressure sensor according to claim 1, wherein the sensor body is generally C-shaped, with the tangential hole running parallel to the secant of the generally C-shape.

3. Pressure sensor according to claim 1 wherein the bolt element is a central assembly element in the form of a screw having a head and a shank, said shank including a lead in hole for leading-in the medium and a transverse hole connecting the leading-in hole to the pressure transducer surface of the sensor body.

4. Pressure sensor according to claim 3, wherein the screw head includes a thread for receiving a shutoff valve.

5. Pressure sensor according to claim 1 wherein the bolt element is a central assembly element having the form of a screw-in stay bolt fitted by a sealing element directly into a cylinder head, a nut on the bolt element presses, the sensor body against a sealing surface of the structure on which the bolt is mounted and is sealed to the sensor body with a seal ring.

6. Pressure sensor according to claim 1 wherein said extensometer in said tangential hole detects strain produced by radially acting pressure in said body from the pressure transducer surface.

7. Pressure sensor according to claim 3 wherein the head of the screw has an axial valve part, which closes the lead-in hole after the transverse holes and after opening by an adjusting screw communicates with the atmosphere via vent holes enabling a piston in an engine to move without compression.

8. Pressure sensor according to claim 5 wherein the shank of the screw-in stay bolt has an axially disposed valve, which closes a lead-in hole in the shank so that no pressure gets to the pressure transducer surface of the sensor body, enabling the sensor body to be changed while an engine is running normally after unfastening the nut.

9. Pressure sensor according to claim 3 wherein the head of the screw includes a valve part inclined or at right angles to the screw axis and a connection for a calibration device.

10. Pressure sensor according to claim 4 wherein the shutoff valve is located after the sensor body, so that the sensor body can be blown through periodically during operation and cleansed of any incrustations.

11. Pressure sensor according to claim 5 wherein the screw-in stay bolt includes an axial valve part and is arranged so that the sensor body may be changed while an engine is operating.

12. Pressure sensor according to claim 1 wherein the pressure space is cylindrical and the bolt element is shaped axially to a press-in plug element in the cylindrical pressure space.

13. Pressure sensor according to claim 1 wherein the sensor body and a mounting connection for the sensor are one piece.

14. Pressure sensor according to claim 13 wherein the bolt element has an axis transverse to the axis of the mounting connection.

15. Pressure sensor according to claim 14 wherein the bolt element has a central hole leading to the connection for a calibration device.

16. Pressure sensor according to claim 1 including a heat sink fitted between the sensor body and an electrical plug.

17. Pressure sensor according to claim 1 wherein the sensor body includes relief slots on both sides of the tangential hole extending in the direction of the tubular pressure gap.

18. Pressure sensor according to claim 1 wherein the extensometer element is fitted in the tangential hole under preload and is constructed on piezoelectric basis.

19. Pressure sensor according to claim 1 wherein the extensometer element is fitted in the tangential hole under preload and is constructed on one of resistive, capacitive or fibre-optic basis.

* * * * *